H. S. PEDERSEN

Feb. 3, 1931. COMBINED SHEET AND ENVELOPE Re. 17,948

Original Filed March 23, 1928 2 Sheets-Sheet 1

Inventor

Hjalmar S. Pedersen.

By William C. Linton.

Attorney

H. S. PEDERSEN
COMBINED SHEET AND ENVELOPE
Feb. 3, 1931. Re. 17,948
Original Filed March 23, 1928 2 Sheets-Sheet 2
Fig. 7.
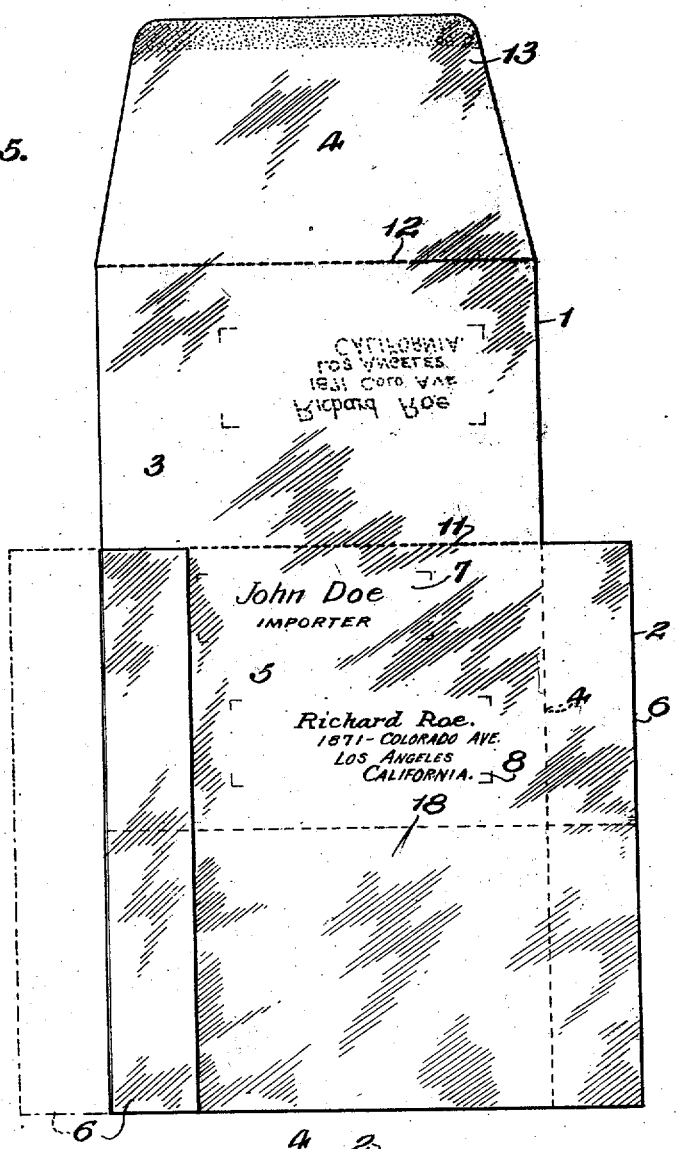
Fig. 5.
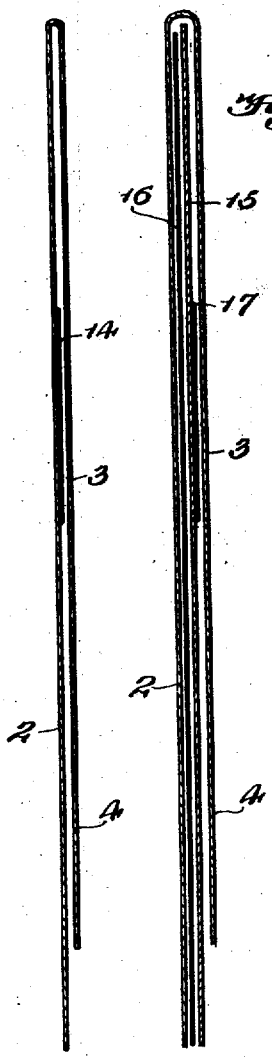
Fig. 6.
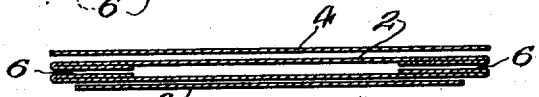
Fig. 4.
Inventor
Hjalmar S. Pedersen.
By William C. Linton.
Attorney Reissued Feb. 3, 1931 Re. 17,948

UNITED STATES PATENT OFFICE

HJALMAR S. PEDERSEN, OF LOS ANGELES, CALIFORNIA, ASSIGNOR, BY DIRECT AND MESNE ASSIGNMENTS, TO GLOBE STATIONERY COMPANY, LTD., OF LOS ANGELES, CALIFORNIA, A CORPORATION OF CALIFORNIA

COMBINED SHEET AND ENVELOPE

Original No. 1,729,400, dated September 24, 1929, Serial No. 264,031, filed March 23, 1928. Application for reissue filed June 7, 1930. Serial No. 459,821.

The present invention relates to a combined letter sheet or bill and envelope, and more particularly to such devices wherein a single sheet of writing paper is conveniently folded and sealed for transmission through the mail and which is capable of transferring the name and address of the addressee upon the envelope portion of the sheet simultaneously with the writing or printing of the same upon the letter or bill portion thereof in order to avoid mistakes which often occur in separately copying the name and address upon the envelope from the letter sheet or bill and likewise save time and labor compared with that required when using the ordinary separate envelope and writing sheets.

Amongst the primary desiderata of the invention is the provision of a self contained letter sheet or bill head and envelope whereby the name and address of the addressee will be properly positioned upon the envelope simultaneously with the writing or printing of the name and address of the addressee upon the letter sheet or bill head.

A further object of the invention is to provide a combined writing sheet and envelope formed of a single sheet of paper which may be readily and conveniently folded and sealed for transmitting through the mails and when so folded and sealed will have the appearance of an ordinary envelope with the name of the addressee placed thereon in the usual and proper position.

In order that the invention and its mode of operation may be readily understood by those skilled in the art to which it appertains, I have in the accompanying illustrative drawings and in the detailed following description based thereupon, set out one possible embodiment of the invention.

In these drawings:

Figure 4 is a horizontal section taken on the line 4—4 of Figure 1.

Figure 5 is a vertical sectional view of the device with its manifold copies when in the position as shown in Figure 2.

Figure 6 is a similar view with the manifold copies removed, and

Figure 7 is a plan view of the blank when used as a combined letter sheet and envelope.

Figure 1:
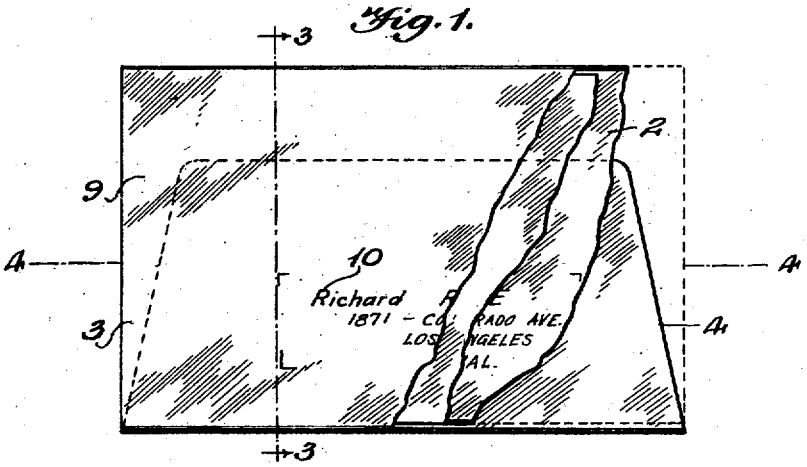
Figure 1 is a front elevation of a combined bill head and envelope made in accordance with the present invention when folded and sealed having portions thereof broken away.

Referring now more particularly to the accompanying drawings wherein like and corresponding parts are designated by similar reference characters throughout, the combined letter sheet or bill head and envelope is formed from a single sheet of paper 1 comprising a writing section 2 and envelope section 3 and a flap section 4.

Figure 2:
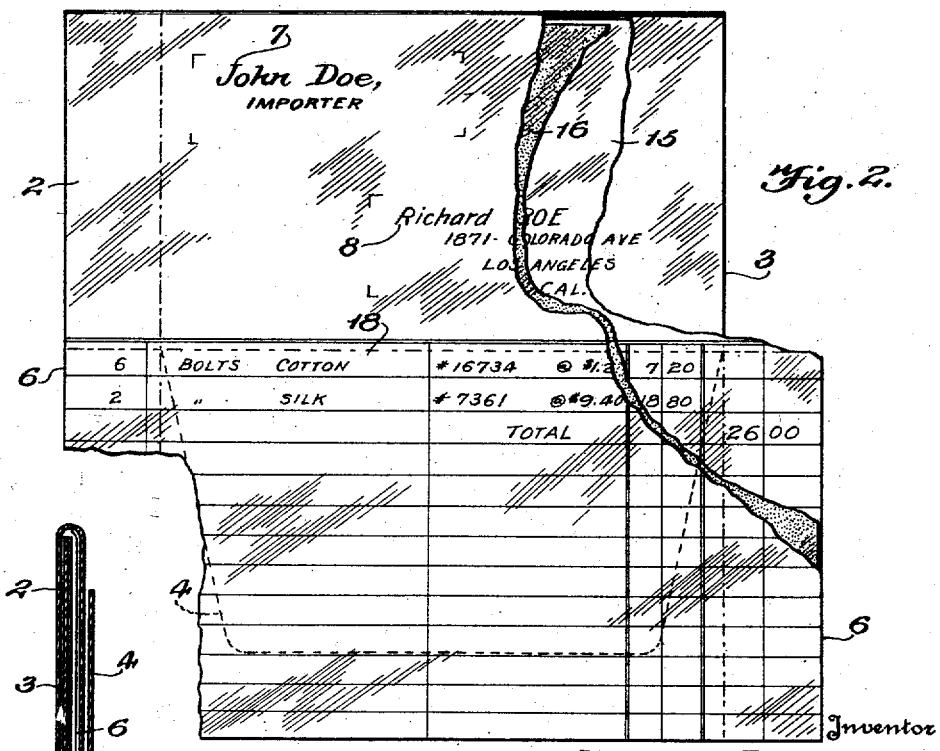
Figure 2 is a front elevation of the bill head having the envelope portion thereof folded in position for transferring the name and address of the addressee upon the envelope, also showing the position of the manifold sheets and copies and having portions thereof broken away.

The writing section 2 may have upon one face thereof suitable rulings for containing a statement of account as is illustrated in Figure 2 or it may be a ruled or blank writing sheet as disclosed in Figure 7 and of course, this section of the sheet may be of any length as required for the communication written or printed thereon or as preference may dictate. This section may be scored, weakened or provided with folding lines 4, dividing the same into a central body section 5 and two wing sections 6. Written, printed or otherwise placed upon the section 2 is the name, address or business of the addressor or persons who desire to convey the communication or statement upon the sheet or section 2 and is placed in the space indicated by the numeral 7. Another space 8 is provided upon the sheet 2 for the name and address of the party to whom the statement is to be forwarded and this name and address is to appear as the addressee upon the envelope.

The envelope section 3 is of a width corresponding to the central body section 5 of the letter sheet and its outer face 9 or the side reverse to that shown in Figure 7 is to have copied thereon the name and address 10 of the addressee which corresponds to and is an exact copy of, the matter written or printed in the space 8 of the sheet 2. This envelope section 3 is connected to the sheet 2 along the perforated line 11 whereby the addressee may sever the envelope section from the sheet 2 if he desires, after receiving the communication.

The flap section 4 is connected to the envelope section along the scored or folding line 12 and is coated with an adhesive substance as indicated by the broken line shading as at 13 for the purpose of sealing the letter or statement as will be hereinafter more fully described.

In order that the name and address as written or printed within the space 8 of the letter sheet may be transferred within the space 10 of the envelope section, the outer face or reverse side of the letter sheet to that shown in Figure 7 is coated with a carbon solution or other preparation suitable to produce a transfer of matter written or imprinted in the space 8 upon the space 10 of the envelope or the usual carbon paper may be employed as is indicated by the numeral 14 in Figure 6. This carbonized portion 13 of the letter sheet need only equal the area portion 8 of the letter sheet.

When it is desired to make manifold copies of the matter written upon the letter sheet or bill form separable letter sheets 15 may be placed in back of the letter sheet or bill form and a sheet of carbon paper 16 placed therebetween as is shown in Figures 2 and 5 of the drawings. In making such carbon copies the back of the sheet 15 should either be carbonized or a piece of carbon paper 17 placed in back thereof or between the last sheet 15 provided more than one manifold copy is required and the envelope section 3 so that the name and address printed within the space 8 of the letter sheet will be transferred to the space 10 of the envelope.

Each combined letter sheet or bill form and envelope comprises a single sheet of paper 1 and before being used is spread out in blank form substantially as that illustrated in Figure 7 and the proprietor's name and address is preferably printed or otherwise placed within the space 7 thereof. Before writing the communication upon the sheet 2 the envelope section 3 is bent upon the perforated line 11 and turned backwardly until it assumes the position as shown in Figure 6. If manifold copies are desired the same together with the carbon paper is then placed between the sections 2 and 3 in the manner as illustrated in Figures 2 and 5 of the drawings. The name and addressee is then placed within the space 8 from where it will be transferred to the manifold sheet 15 and the envelope section. The matter to be conveyed either in bill form or letter may then be written upon the sheet 2 and copies thereof will only be transferred to the sheet 15 which latter together with the carbon paper should be removed before mailing.

Figure 3:
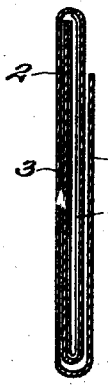
Figure 3 is a vertical section taken on the line 3—3 of Figure 1 in the direction of the arrow points.

To fold the sheet in the form of an envelope the wing sections 6 are first folded inwardly in the manner as is illustrated at the right of Figure 7 to suitably stiffen the writing section of the envelope when folded, and the section 2 is then folded upon the line 18. The envelope section which has been previously folded to the back of the section 2 is now folded upon the line 11 in a reverse direction or until it extends over the folded section 2 and it is now bent to the back of the folded section 2 in the manner as best illustrated in the Figure 3.

The adhesive coating 13 is then dampened and pressed against the back of the folded section 2 whereat the envelope will be sealed and now ready for stamping and mailing.

From a consideration of Figure 1 it will be noted that when the sheet is folded in envelope form it will have the appearance of an ordinary envelope without any flap or other sealing means upon the face thereof. The addressee's name will also appear upon the proper place of the face of the envelope section leaving ample space at the upper left hand corner for the usual sender's name and return address as well as space at the upper right hand corner for the stamps.

The line 12 between the flap 4 and envelope section 3 may be perforated so that the addressee may tear the envelope along this line 12 and readily unfold the letter sheet or bill form.

Manifestly, the construction shown is capable of considerable modification and such modification as is within the scope of my claims, I consider within the spirit of my invention.

I claim:

1. An address duplicating combined sheet and envelope comprising a single sheet of paper having parallel transverse fold lines producing a writing section, an envelope section and a flap section, the writing section being of greater width than the envelope section and having a central body portion of the same width as the envelope section and two winged sections projecting from the opposite sides of said central body section, the writing section having an appropriately designated space upon one face thereof for the addressee's name and address and a coating of transfer material arranged upon the opposite face thereof over the appropriately designated space for the addressee's name and address, only, whereby the reproduction of an impression of the matter written within said space for the addressee's name and address may be effected; the envelope and flap sections being capable of being bent upon the transverse fold line between the writing section and the envelope section whereby the envelope and flap sections may lie parallel with the writing section and the matter written within the appropriately designated space for the addressee's name and address may be transferred to a corresponding appropriately designated space on the envelope section; the wing sections of said writing section adapted to be folded thereon whereby said envelope section being folded upon the transverse fold line between the writing and envelope sections, extends completely over one face of the so folded writing section and sealed to the opposite face of the folded writing section over which face the envelope section extends.

2. A combined sheet and envelope, comprising a sheet of paper adapted to be folded to provide a writing section and an envelope address section, the writing section having on its rear face an area of transfer material, the sheet being adapted to be folded at the line of joinder of the writing section with the envelope section so that the name and address of the addressee as written on the writing section of the sheet is transferred to the outside face of the envelope section, and a flap section connected with the envelope section adapted when folded to cover the area of transfer material.

3. A combined sheet and envelope, comprising a sheet of paper adapted to be folded to provide a writing section and an envelope address section, the writing section having on its rear face an area of transfer material, the sheet being folded at the line of joinder of the envelope and writing sections over the envelope section with the front face of the writing section outermost so that the name and address of the addressee as written, printed, or typed on the writing section of the sheet is transferred to the outer face of the envelope section, and a flap section connected with the envelope section foldable over the writing section to cover the area of transfer material when the envelope section is folded to bring the outside face of the envelope outermost.

Signed at Los Angeles, in the county of Los Angeles, State of California, this 12th day of May, 1930.

HJALMAR S. PEDERSEN.